UNITED STATES PATENT OFFICE.

CHARLES S. PALMER, OF PITTSBURGH, PENNSYLVANIA.

COMPOSITION FOR PROTECTIVE COATINGS.

1,395,451. Specification of Letters Patent. Patented Nov. 1, 1921.

No Drawing. Application filed February 20, 1919. Serial No. 278,288.

*To all whom it may concern:*

Be it known that I, CHARLES S. PALMER, a citizen of the United States, residing at Pittsburgh, county of Allegheny, and State of Pennsylvania, have invented certain new and useful Improvements in Compositions for Protective Coatings, of which the following is a specification.

The present invention relates to compositions adapted for use in protecting metallic or alloy-like surfaces which are subjected to high, dry heat and to coatings applied to such surfaces and which were originally such compositions before proper heat treatment.

An object of the invention is to enable the provision of, and to obtain, an infusible, non-oxidizable protective coating for iron and other metals, and alloys, when heated in a dry heat; that is, the obtained coatings will allow the metal or alloy to be heated continuously and strongly for long periods of time, without the metal or alloy suffering burning or oxidation from the heat and draft of air or other gases.

It is possible to make enamel-like coatings, and to apply them to the surface of the exposed parts of the iron or other metals, yet some of the troubles are that the coating is too thin to protect the iron or other metal; that if made thinner, and even if very infusible, yet when subjected to high heats, and for long periods of time, the glass-like or enamel-like coating will run and flow down or off, and leave the surface of the metal exposed.

Even if the enamel-like coating is made of very infusible materials, yet if sufficiently fusible to coat the metal, in time it will flow off.

Hence the needs of the new coating suggest that it shall consist of such a variety of materials, and of cheap materials, that while there is some glass-like or enamel-like material present, yet this part must not be present in sufficient degree to let the whole mass flow, even if the glass-like or enamel-like part does melt, but only enough of it to serve as a drying binder, so that the mass of the whole does not obey the laws of liquids, but of solids. It is well known that a small proportion of some liquid or semi-liquid binder, can hold the whole mass together, and still let the mass act as a solid; where the adhesion and cohesion shall preponderate over the flowing tendency of the binder as such and if alone. Thus it is quite easy to compound a mixture of glassy or potentially glassy materials, with infusible and non-oxidizable, and heat-conducting materials,— so that the whole shall be bound together in one compact mass, that shall not flow, but will adhere to the metal surface and protect the same, even in long and severe heating, and in the "dry condition," that is where the inside of the metal container is not cooled by liquids.

There are several conditions and qualities which must be combined, and which are obtained, in this desirable mixture:

(1). The coating must be thin, one-eighth to one-half inch thick, or less, like an enamel covering.

(2). The coating must conduct heat well, or fairly well; hence the use of graphite.

(3). The coating must adhere well to the metallic surface, as with, or without, the use of cobalt oxid or a cobalt glass.

(4). The coating must protect well the metallic surface from burning, oxidation and rusting.

(5). The coating must last well, and endure the strain of long heats and oxidation.

(6). The composition must "mix" well; that is, form an easily handled paste when applied as a coating to the metallic surface.

Now it happens that all of these desirable qualities are easily obtained by a mixture of common substances, such as sand, graphite, water-glass, and the like; including any of the "glasses", such as pulverized glass substances of many compositions, and also including any of the phosphate or borate glasses; including also the cheaper forms of graphite with silicious material, such as are used for cheap paints; including also many forms of the artificial abrasives such as carborundum-like or alundum-like substances. The specific objects of my invention seem to have been overlooked in the multitudinous uses of these common substances.

While I claim any or all of the many combinations implied in the mixture of the simple ingredients mentioned, yet I will specifically describe some of the simpler and cheaper mixtures, their preparation, application, and uses.

I may take a mixture of twenty parts of common sand, or the equivalent, of say forty mesh, with five to twenty parts of graphite and enough soluble or water-glass to mix well (say 10 to 15 cubic cent. saturated solution), the water-glass solution being for the double purpose of first mixing to the proper paste, and also later of helping the rest of the glass material present to melt together, adhering to the grains (of sand), and holding or binding together by adhesion the sand and graphite. The modicum of water-glass is insufficient to let the whole mass flow when applied as a coating, but is absorbed by the solid parts of the mixture. Suppose one takes such a mixture and applies it to the metallic surface and lets it dry thoroughly and slowly. It will take some hours to "cake" well; but the mass soon "sets" more or less. Then it is necessary to heat the coating slowly and preferably from the outside; if heated from the iron or metal side it is detached more or less from the metal surface, and this is shown by "blistering". But, if care is taken in drying and heating, the coated metal may then be subjected to the most intense heat and for long periods of time, and there is no indication of fusion, of oxidation, or of wasting away; and the metal surface is protected.

The above and other compositions may be used for forming the desired coatings, and among some of the others I may mention the following:

Sand, 10 parts; powdered hard glass, 10 parts; graphite, 5 to 20 parts, with enough saturated soluble glass to mix well;

Or; sand, 10 parts; powdered hard glass, 10 parts; graphite, 5 to 20 parts; solid sodium silicate 1 to 5 parts; with enough soluble glass to mix well (say, 10 to 15 cubic cent. saturated solution).

Or; sand, 20 parts; solid sodium silicate 2 to 5 parts; graphite 5 to 20 parts; with enough soluble glass to wix well.

Metallic or alloy-like surfaces which are subjected to high, dry, heat and to which compositions such as described, have been properly applied, dried and sufficiently highly heated, will have applied thereto a coating, shell, calx, sinter, calcine, frit or the like, to prevent burning, rusting, oxidation and decay of the metal or alloy, or the like.

In the ultimate coating, the silicious or other refractory material, which is not itself of first rate heat conducting power, is bound closely together with the graphite, which is a good conductor of heat, not as compared with metals, but good as compared with earthy and silicious materials,—ten times as good certainly,—and the whole is held together by the small proportion of the "glassy" binder, which makes the first paste, and later serves to hold the whole together by the enormous binding influence that acts between the surfaces of solids, in what is called "adhesion" and "cohesion", and which, though not well understood, is well known to be enormous so that the whole mass is held to the surface of the metal, to which the paste must be appropriately adapted in making the first mixture; and the dried and burnt paste conducts heat well, by reason of the contained graphite, which is non-combustible, or so slow that it is practically so under the conditions; and the composition of the glassy materials may be varied so that they are infusible or simply sintered in part fusion or slow fusion. Also, the mixture must be adapted with enough basic materials that when fused it shall not corrode the metal, and that is also hindered by the slight reducing action of the graphite.

Attention should be directed to the large group of the "new refractories," such as magnesia, ziconia, and the like, all of which will serve in their place, for helping to make the protective coating. But, in all of these, the main fact is used,—that there is just enough of some fusible or partly fusible binder,—to hold together the infusible or refractory mass,—so that the whole will rest on the surface to be protected, and will not flow off as it would, if the whole were fusible,—but sticks, somewhat like a "sinter" or slag, which can not flow off, but is held together by the binder, and thus obeys the laws not of liquids, but of adhesive solids,—due presumably to the action preponderating of the strong surface tensions and attractions between the slight quantity of binder and the surface tensions and attractions of the infusible parts of the mass.

I may use thin (first) coating of "cobalt" compounds, such as cobalt-oxid with water-glass, in assisting or causing the protective coating to adhere well to the metallic surface. The rationale of the use of "cobalt" compounds in causing enamels to adhere well to iron or metallic surfaces is not understood; but the fact of their efficiency is known, and is used in the "enamel" industry. In the case of other metals, the intermediary may be changed, depending on the nature of the metal or alloy; and I do not limit myself to this alone, but adapt substances to conditions.

The described coating may be used anywhere, where metal or alloy-like surfaces have to be protected from high, dry, heat and may be used specifically as a protective coating for ovens, retorts, crucibles, and the like. In fact, anywhere, where long and strenuous heating is required, and where quickness of conveying the heat to the interior is desired.

What I claim is:

1. A composition, adapted for use in protecting metallic or alloy-like surfaces which are subjected to high heat, and which consists of approximately twenty parts of practically non-fusible solid material and from five to twenty parts of heat-conducting solid material, and a relatively small proportion of a liquid-like binder, insufficient in quantity to allow the mass to flow when heated but which is absorbed by the solid particles, while at the same time causing them to cohere, the indicated materials being largely granular and mixed intimately with said binder so as to produce a pasty mass.

2. A composition, adapted for use in protecting metallic or alloy-like surfaces which are subjected to high heat, and which consists of granular silicious material; five to twenty parts graphite and a modicum of binder, intimately mixed together.

3. A composition, adapted for use in protecting metallic or alloy-like surfaces which are subjected to high heat, which contains ten parts, at least, of sand, five to twenty parts of graphite, a relatively small proportion of glass, and enough soluble glass to mix well.

4. A composition, adapted for use in protecting metallic or alloy-like surfaces which are subjected to high heat, which contains ten parts of sand, ten parts of powdered hard glass, five to twenty parts of graphite, and enough soluble glass to mix well.

5. A composition, adapted for use in protecting metallic or alloy-like surfaces which are subjected to high heat, which contains ten parts, at least, of sand, five to twenty parts of graphite, one to five parts of solid sodium silicate, a relatively small proportion of glass, and enough soluble glass to mix well.

6. A composition, adapted for use in protecting metallic or alloy-like surfaces which are subjected to high heat, which contains ten parts of sand, ten parts of powdered hard glass, five to twenty parts of graphite, one to five parts of solid sodium silicate, and enough soluble glass to mix well.

7. A protective coating for metallic or alloy-like surfaces subjected to high heat, composed of materials, which are: poor conductors and good conductors of heat, relatively to each other, practically non-combustible, non-corrosive, partly non-fusible and partly fusible, and tenaciously bound together and adhering to the said surface.

8. A protective coating for metallic or alloy-like surfaces subjected to high heat, consisting of a mixture of sand, graphite and a modicum of soluble glass, which under the influence of heat fuses, frits, sinters or calcines, and which coheres to itself but adheres to such surface.

9. A protective coating for metallic or alloy-like surfaces subjected to high heat, composed partly of previously fused and partly of previously unfused or soluble glass-like material serving as a binder, before heating the surface, and as a binder of glass-like material after highly heating the surface, and a calcined unfused mass bound together by said binder, said unfused mass being heat-conducting in part and in part refractory.

CHARLES S. PALMER.